Aug. 7, 1962 R. B. FAULK 3,048,694
ILLUMINATED POLYHEDRIC FORMS
Filed Feb. 24, 1958 3 Sheets-Sheet 1

INVENTOR.
RAYMOND B. FAULK

ATTORNEYS

Aug. 7, 1962   R. B. FAULK   3,048,694
ILLUMINATED POLYHEDRIC FORMS
Filed Feb. 24, 1958   3 Sheets-Sheet 2

INVENTOR.
RAYMOND B. FAULK

ATTORNEYS

Aug. 7, 1962  R. B. FAULK  3,048,694
ILLUMINATED POLYHEDRIC FORMS

Filed Feb. 24, 1958  3 Sheets-Sheet 3

INVENTOR.
RAYMOND B. FAULK

ATTORNEYS

United States Patent Office 3,048,694
Patented Aug. 7, 1962

3,048,694
ILLUMINATED POLYHEDRIC FORMS
Raymond B. Faulk, 8501 Williams St., Dearborn, Mich.
Filed Feb. 24, 1958, Ser. No. 717,179
9 Claims. (Cl. 240—10)

The present invention relates to illuminated polyhedric forms suitable for a variety of decorative purposes and especially suitable for display advertising.

Among the objects of the invention is to provide devices in which the polyhedral forms will appear as lines of light of one or several colors apparently unsupported in space.

Another object is to provide a device in which such polyhedral lines of light may have words or letters associated therewith within the space included by the light lines.

Still other objects will readily occur to those skilled in the art upon reference to the following description and the accompanying drawings in which FIG. 1 is a view in elevation of a device embodying the invention.

Figure 1:
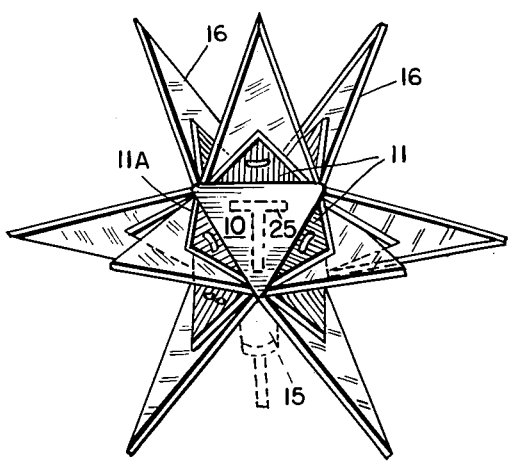

In the description which follows, there is described a regular octahedral form of the device, but the invention may be embodied in other polyhedral forms regular or irregular as described below.

In FIGS. 1 to 5, the device is illustrated as a casing forming a regular octahedron made up of eight identical pieces 10 of sheet metal or other suitable opaque or semi opaque material, these being in the form of equilateral triangles having their apex portions 11 bent up along lines extending from the central point of one side to the central point of an adjacent side and at a forty-five degree angle. These triangular pieces are identical except that in one of the pieces a suitable opening 12 is provided so that there may be inserted a light bulb and socket 15. Also, it is preferred to so shape the pieces 10 that the base line portion of the turned up corner or flange 11 is somewhat shortened as shown at 11A in FIGS. 1 to 4 and 5.

These several triangular pieces 10 are assembled with their flanges in opposed relation, but between opposing flanges at the dihedral angles thus formed are inserted suitably shaped wings or pieces of transparent light conducting material, preferably the plastic material known to the trade as "Lucite," and may be single sheets or be laminated and of several colors, the laminations not necessarily coextensive. The flanges and "Lucite" are then fixed together by any suitable means such as staples 17. The wings 16 will preferably extend well beyond the edges of the members 10, and may be pointed as shown, or of any other desired shape, and may have their outer edges straight, serrated, somewhat curved or otherwise shaped.

Since only the edges of the wings 16 are intended or desired to be clearly visible, these are preferably slightly rounded and somewhat roughened to disperse the light being transmitted.

Figure 2:
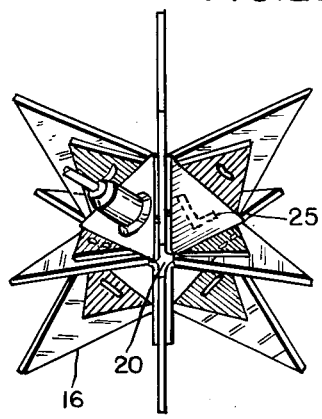
FIG. 2 is a second view in elevation, but from a different angle.
Figure 3:
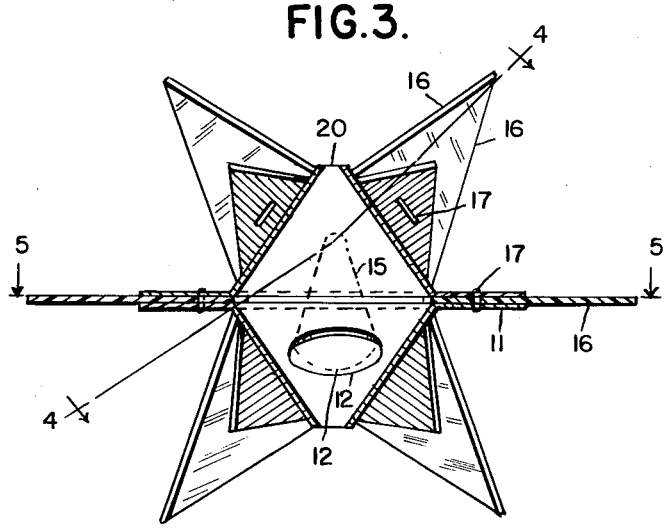
FIG. 3 is a sectional view as if on line 3—3 of FIG. 5.
Figure 6:
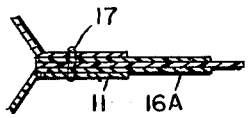
FIG. 6 is fragmentary detail of the construction.
Figure 4:
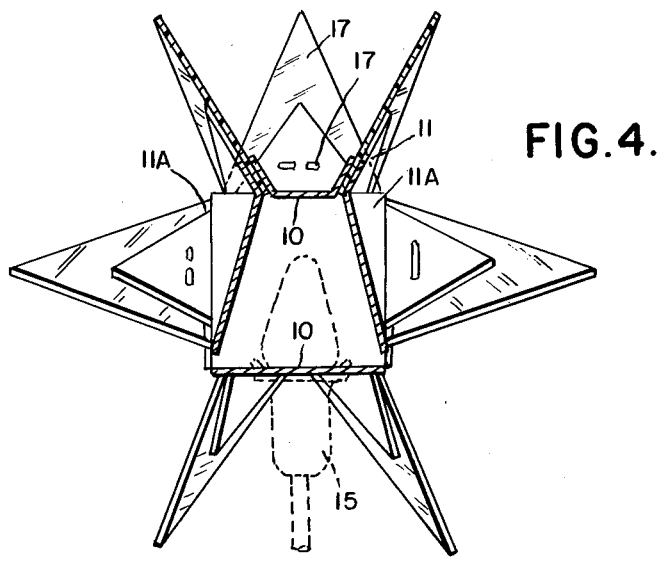
FIG. 4 is a sectional view as if on line 4—4 of FIG. 3.
Figure 5:
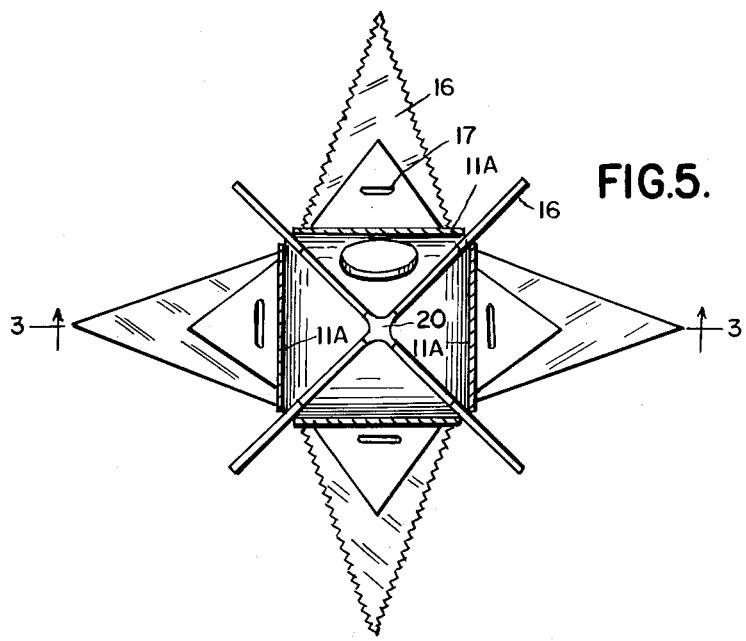
FIG. 5 is a sectional view as if on line 5—5 of FIG. 3.

It will be noted particularly from FIGS. 2 and 5, that in this construction openings 20 will occur at the apices of the body portion of the octahedron. These openings will allow sufficient ventilation to prevent overheating by the light bulb 15 and are therefore important.

It is also important that the triangular pieces 10 provide an inner reflective surface since such a surface greatly intensifies the light appearing at the edges of the parts 16.

As mentioned above, the metal parts 10 are opaque or substantially so, but if desired, may be provided with perforations or transparent inserts showing letters 25 or other symbols.

In the form of the device showing letters or symbols, suitable means for rotation may be provided, so that, in rotation, a desired word or words will be spelled out. A Tetrahedron will show a four letter word. A dodecahedron may show twelve letters.

As also mentioned above, the invention is not to be restricted to an octahedral form, as any of the regular polyhedral forms from tetrahedral up may be used.

It is of course obvious that a colored light bulb or bulbs may be used as the light source or that the light conducting material may be of one or several colors.

Figure 8:
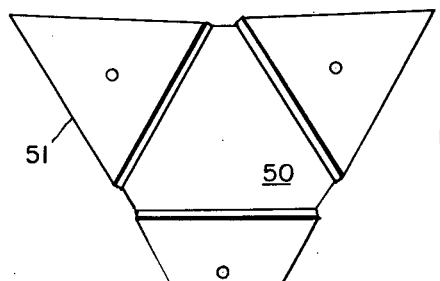
FIG. 8 is a top view of the part shown in FIG. 7.
Figure 10:
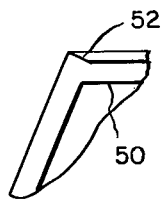
FIG. 10 is an enlarged fragmentary detail of a corner of the part shown in FIG. 7.
Figure 7:
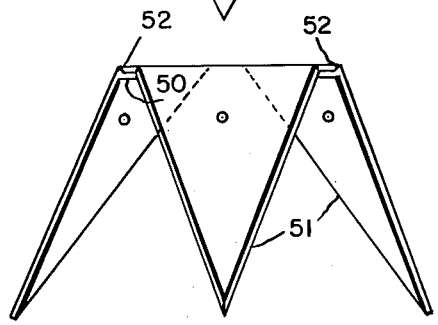
FIG. 7 is a side elevation of one part of a modified structure.
Figure 9:
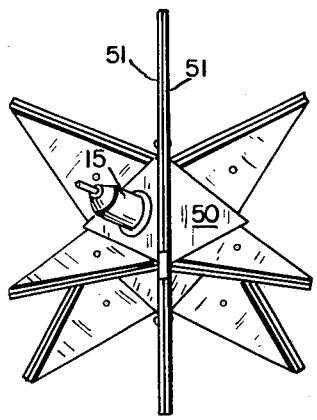
FIG. 9 is a view in elevation of a polyhedral form made of parts such as shown in FIGS. 7 and 8.

In FIGS. 7, 8 and 9 is shown another polyhedral form in which the faces and wings are molded as identical integral parts and fixed together by fixing wing portions to each other.

Such a part is shown in detail in FIGS. 7 and 8, in which the face plate is indicated at 50 and the integral wing portions at 51. The wing portions 51 are integral with plate 50 but are so molded that the inner edge of a wing portion is a clearly defined plane surface 52 normal to the plane of the wing.

In molding the part, the wings 51 are molded at an angle to the plate 50 which is supplemental to one half of the dihedral angle of the polyhedron.

When the parts 50—51 are placed together with a wing of one part registering with and lying against a wing of an adjacent part and rivetted or otherwise secured thereto, a polyhedral form such as shown in FIG. 9 is obtained.

One of the parts 50—51 may be provided with a suitable opening for the insertion of a bulb and socket 15 to furnish inside illumination and the outer faces of the plates 50 may be rendered opaque in any suitable manner.

If desired also, a third wing plate of the same or a different shape may be fixed between two wings 51 or the wings 51 may be of somewhat different size and have their outer perimeters different if desired, the plates 50 and root portions of the wings 51 will, if course, be identical in size and shape.

I claim:

1. An illuminated polyhedral assembly comprising a plurality of separate complementary structures each comprising a flat polygonal non-transparent base portion and flanges extending outwardly from each edge of said base portion at an angle to the plane thereof, said structures being assembled to form a hollow polyhedral casing having faces defined by the base portions of said structures, and the flanges of adjacent structures being secured together and forming wings extending outwardly in a multiplicity of planes, means illuminating the interior of said casing, at least a portion of each of said wings comprising a layer of light conducting material having an edge exposed to the interior of said casing and outer exposed edges exteriorly of said casing.

2. The assembly as defined in claim 1 and in which each flange is of flat light conducting material and has an inner edge exposed to the interior of said casing, and in which the inner edge of each flange is disposed in a plane normal to the plane of the flange.

3. The assembly as defined in claim 1 and in which the inner surfaces of said base portions are of light reflective material.

4. The assembly as defined in claim 1 and in which the flanges extending from adjacent edges of adjacent structures are disposed in parallel planes.

5. The assembly as defined in claim 4 and in which said parallel flanges are of light conducting material in back to back face abutment.

6. The assembly as defined in claim 1 in which each of said light conducting portions comprises a light conducting flat plate element sandwiched between and secured to each pair of parallel flanges, said plate elements extending outwardly from said casing beyond said flanges.

7. An illuminated polyhedral assembly comprising a plurality of separate complimentary structures each comprising a flat polygonal non-transparent base portion and flanges extending outwardly from each edge of said base portion at an angle to the plane thereof, said structures being assembled to form a hollow polyhedral casing bounded by the base portions of said structures, and the flanges of adjacent structures being secured together and forming wings extending outwardly in a multiplicity of planes, means illuminating the interior of said casing, at least a portion of each of said wings comprising a layer of light conducting material having an edge exposed to the interior of said casing and outer exposed edges exteriorly of said casing, the corners of said polygonal base portions are truncated whereby said assembled together polyhedral casing is provided with openings at the apices thereof.

8. An illuminated polyhedral assembly comprising a plurality of separate complementary structures each comprising a flat polygonal non-transparent base portion and flanges extending outwardly from each edge of said base portion at an angle to the plane thereof, said structures being assembled to form a hollow polyhedral casing having faces defined by the base portions of said structures, and the flanges of adjacent structures being secured together and forming wings extending outwardly in a multiplicity of planes, a flat plate element sandwiched between and secured to each pair of flanges secured together, said plate elements extending outwardly from said casing beyond said flanges, and means providing light emanation from the outer edges of said plate elements.

9. An illuminated polyhedral assembly comprising a plurality of separate complimentary structures each comprising a flat polygonal non-transparent base portion and flanges extending outwardly from each edge of said base portion at an angle to the plane thereof, said structures being assembled to form a hollow polyhedral casing having faces defined by the base portions of said structures, and the flanges of adjacent structures being secured together and forming wings extending outwardly in a multiplicity of planes, and means providing light emanation from at least portions of the outer edges of said wings.

References Cited in the file of this patent

UNITED STATES PATENTS

| | | |
|---|---|---|
| D. 103,953 | Pollock | Apr. 6, 1937 |
| D. 128,364 | Cruze | July 22, 1941 |
| 1,200,487 | Grimm | Oct. 10, 1916 |
| 1,504,682 | Fraling | Aug. 12, 1924 |
| 1,728,547 | Herweg | Sept. 17, 1929 |
| 1,861,604 | Loring | June 7, 1932 |
| 1,931,742 | Scharringhausen | Oct. 24, 1933 |
| 2,183,326 | Thaeler | Dec. 12, 1939 |
| 2,199,434 | Koonz | May 7, 1940 |
| 2,359,559 | Horky | Oct. 3, 1944 |

FOREIGN PATENTS

| | | |
|---|---|---|
| 3,738 | Great Britain | Apr. 1, 1899 |
| 274,878 | Switzerland | July 16, 1951 |